(12) United States Patent
Li et al.

(10) Patent No.: US 8,331,803 B2
(45) Date of Patent: Dec. 11, 2012

(54) CLOCK RECOVERY METHOD FOR POLARIZATION MULTIPLEXED COHERENT OPTICAL COMMUNICATIONS

(75) Inventors: Chuandong Li, Ottawa (CA); Zhuhong Zhang, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 522 days.

(21) Appl. No.: 12/574,852

(22) Filed: Oct. 7, 2009

(65) Prior Publication Data
US 2011/0081150 A1    Apr. 7, 2011

(51) Int. Cl.
  H04B 10/00    (2006.01)
  H04B 10/06    (2006.01)
(52) U.S. Cl. ......... 398/206; 398/152; 398/208; 398/209
(58) Field of Classification Search .................. 398/152, 398/202, 205, 206, 208, 209
See application file for complete search history.

(56) References Cited

U.S. PATENT DOCUMENTS

| 7,406,269 | B2 * | 7/2008 | Becker et al. ................. 398/206 |
| 7,532,822 | B2 | 5/2009 | Sun et al. |
| 7,627,252 | B2 * | 12/2009 | Sun et al. ...................... 398/155 |
| 7,672,656 | B2 * | 3/2010 | Husted ........................... 455/296 |

OTHER PUBLICATIONS

Godard, D. N., "Passband Timing Recovery in an All-Digital Modem Receiver," IEEE Trans. Commun., vol. COM-26, No. 5, p. 517, 1978.

* cited by examiner

*Primary Examiner* — Dalzid Singh
(74) *Attorney, Agent, or Firm* — Conley Rose, P.C.; Grant Rodolph; Clint Wilkins

(57) ABSTRACT

An apparatus comprising a plurality of receivers each configured to receive a plurality of polarized signals, a voltage control oscillator (VCO) coupled to the receivers and configured to control timing and sampling frequency of the polarized signals, and a signal processing component coupled to the receivers and configured to update a plurality of weighted linear factors, wherein the polarized signals and the weighted linear factors are used to obtain a combined signal, and wherein the weighted linear factors are updated using a real part or an imaginary part of the combined signal. Included is a method comprising using a linear factor to combine a plurality of polarized optical signals to provide time recovery information, and updating the linear factor using a combination of the polarized optical signals.

20 Claims, 7 Drawing Sheets

CLOCK RECOVERY METHOD FOR POLARIZATION MULTIPLEXED COHERENT OPTICAL COMMUNICATIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In optical communications, many modulation schemes have been used to transport data. On-Off keying (OOK) is one modulation scheme that has been used, where data is encoded using signal intensity variation. OOK introduces strong characteristic tones in the signal frequency domain, which can be detected as periodic intensity variations in the signal. To detect the signals, a conventional clock recovery scheme is used to obtain the timing information in the tones, such as by filtering the detected signal intensities using a narrow band pass filter. Phase Shift Keying (PSF) is another modulation scheme that has been used more recently. In PSF, the data is encoded using signal phase variation. Therefore, the conventional clock recovery for OOK, which is based on detecting signal intensities, is not suitable for PSF modulation. Instead, other clock recovery algorithms have been proposed for PSF, such as early-late gate, Mueller-Muller, and Gardner algorithms. These algorithms are based on the assumption that the distortion of the signal passing through an optical fiber, e.g. due to fiber dispersion and polarization mode dispersion (PMD), is relatively small with respect to the signal and thus the rising/falling edge of the signal can be easily detected. However, for higher data transmission rates, such as 100 Gigabit systems, the signal can be highly distorted due to fiber dispersion and PMD and the rising/falling edge of the signal cannot be easily detected. Therefore, other clock recovery algorithms that are based on timing information in the signal are used.

SUMMARY

In a first embodiment, the disclosure includes an apparatus comprising a plurality of receivers each configured to receive a plurality of polarized signals, a voltage control oscillator (VCO) coupled to the receivers and configured to control timing and sampling frequency of the polarized signals, and a signal processing component coupled to the receivers and configured to update a plurality of weighted linear factors, wherein the polarized signals and the weighted linear factors are used to obtain a combined signal, and wherein the weighted linear factors are updated using a real part or an imaginary part of the combined signal.

In a second embodiment, the disclosure includes an apparatus comprising at least one processor configured to implement a method comprising receiving a plurality of polarized multiplexed optical signals multiplying the polarized multiplexed optical signals by a plurality of weighted linear terms combining the polarized multiplexed optical signals multiplied by the weighted linear terms to obtain a combined complex signal using one of the real part or imaginary part of the combined complex signal to update the weighted linear terms, and using the other one of the real part or imaginary part of the combined complex signal to control clock timing.

In a third embodiment, the disclosure includes a method comprising using a linear factor to combine a plurality of polarized optical signals to provide time recovery information, and updating the linear factor using a combination of the polarized optical signals.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for improved clock recovery. The clock recovery may be used for optical signals that may be distorted by fiber dispersion and/or PMD. The optical signals may be polarization multiplexed optical signals comprising two differently polarized signal components, which may have different clock timing offsets and PMD caused timing offset. In the frequency domain, the clock recovery may combine the real parts of the two signal components using a first weighted linear term and may combine the imaginary parts of the two signal components using a second weighted linear term. The combined real parts and imaginary parts may then be used to obtain a combined signal. The imaginary part of the combined signal may be used by a VCO to control timing and sampling frequency and the real part of the combined signal may be used to update the first weighted linear term and the second weighted linear term. Alternatively, in the time domain, the clock recovery may combine a first weighted linear term and a second weighted linear term with the first signal component and the second signal component to obtain a combined signal. The real part of the combined signal may then be used by the VCO and the imaginary part of the combined signal may be used to update the first weighted linear term and the second weighted linear term.

Figure 1:
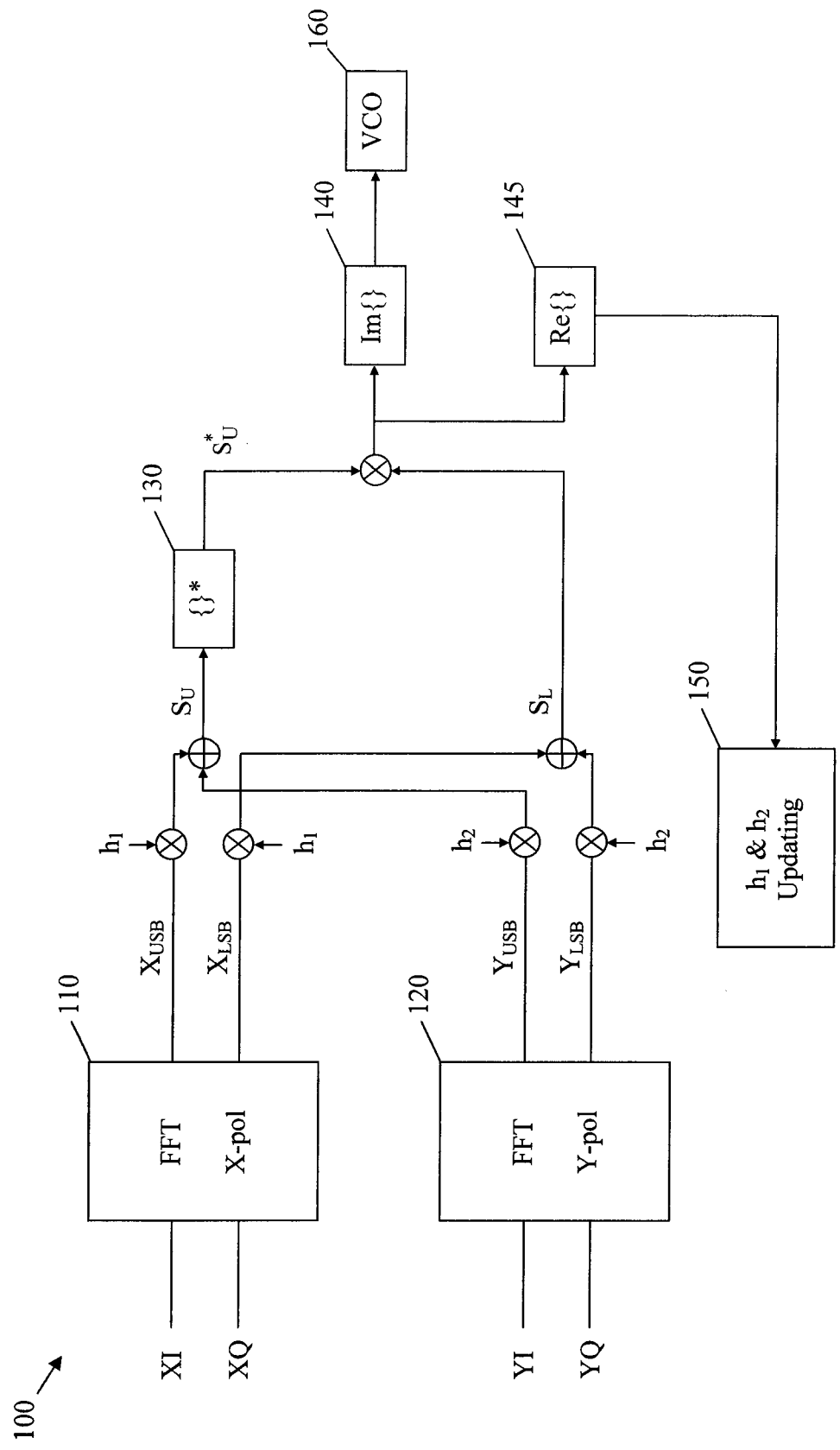
FIG. 1 is a schematic diagram of an embodiment of a clock recovery system.

FIG. 1 illustrates one embodiment of a clock recovery system 100, which may be used to obtain the timing information of polarization multiplexed optical signals. The clock recovery system 100 may be based on the Godard clock recovery algorithm for frequency domain signals and may be implemented using hardware, software, or both. The Godard clock recovery algorithm is described by Dominique Godard in "Passband Timing Recovery in an All-Digital Modem Receiver," which was published in May 1977 by the Institute of Electrical and Electronics Engineers (IEEE) Transactions on Communications and is incorporated herein by reference as if reproduced by its entirety. However, unlike the Godard clock recovery algorithm that was established for optical signals comprising one component or channel, e.g. one polarized component, the clock recovery system 100 may be used for polarization multiplexed optical signals, which may comprise an X-polarized optical component and a Y-polarized optical component. The two different polarized components may be distorted due to fiber dispersion and PMD effect, e.g. between the transmitter and the receiver, and therefore may have different clock timing offsets and PMD caused timing offset.

Typically, the received multiplexed optical signals may be split into four channels, for instance by an optical demultiplexer or splitter. The first channel may comprise the real part of the X-polarized component (XI), the second channel may comprise the imaginary part of the X-polarized component (XQ), the third channel may comprise the real part of the Y-polarized component (YI), and the fourth channel may comprise the imaginary part of the Y-polarized component (YQ). The four channels may be received at about twice the baud or modulation rate of the transmitted multiplexed optical signals, and may be quantized for digital signal processing (DSP), for instance using an analog to digital converter (ADC). The DSP processing may comprise compensating for relatively large dispersion in the transmitted signal, which may be stable over relatively long time transmission periods.

The quantized signal channels may be processed using the clock recovery system 100, which may comprise a plurality of functional blocks. Specifically, the clock recovery system 100 may comprise a first Fast Fourier Transform (FFT) block 110 (e.g. for X-polarization), a second FFT block 120 (e.g. for Y-polarization), a complex conjugate block 130, an imaginary component block 140, a real component block 145, a first and second weighted linear term or factor ($h_1$ & $h_2$) update block 150, and a VCO block 160. Additionally, the clock recovery system 100 may comprise different mathematical operation blocks, such as addition and multiplication blocks, which are indicated by the circles containing the "+" and "×," respectively.

In an embodiment, the first FFT block 110 may be configured to receive X-polarization signals, e.g. the first channel and second channel, in the time domain and convert the signals into corresponding signals in the frequency domain. When the complex signal is in the frequency domain (e.g. after the FFT), it is truncated to obtain an Up-Side-Band (USB) signal $X_{USB}$ and a Low-Side-Band (LSB) signal $X_{LSB}$. Similarly, the second FFT block 120 may receive Y-polarization signals, e.g. the third channel signal YI and fourth channel signal YQ, and convert the signals into the frequency domain, e.g. an USB signal $Y_{USB}$ and LSB signal $Y_{LSB}$, respectively.

Each of $X_{USB}$ and $X_{LSB}$ may then be multiplied by a first weighted linear term $h_1$, and each of $Y_{USB}$ and $Y_{LSB}$ may be multiplied by a second weighted linear term $h_2$. The resulting weighted frequency domain signals, e.g. $X_{USB}$, $X_{LSB}$, $Y_{USB}$, and $Y_{LSB}$, may then be combined to obtain two signal components $S_U$ and $S_L$. The complex conjugate block 130 may be configured to obtain the complex conjugate of $S_U$ ($S^*_U$), which may then be multiplied by $S_L$ to obtain a frequency domain combined signal. For instance, the combined signal may be equal to the sum of the products of $S^*_U$ and $S_L$ for a plurality of frequencies, such as $$\sum_{k=1}^{N} S^*_U(k) \cdot S_L(k),$$

where k is an integer that enumerates the frequencies and N is the number of considered frequencies in the signal. The step size used to evaluate the combined signal using the equation above may be chosen to track the State of Optical Polarization (SOP) of the signal transmission link without interrupting clock recovery. Tracking the SOP of the link without interrupting clock recovery may be possible since the frequency rate of SOP may be on the order of tens of kilohertz (kHz) and the jitter bandwidth in clock recovery may be faster on the order of megahertz (MHz).

The imaginary component block 140 may be configured to obtain the imaginary part of the combined signal, $$\text{e.g. } \text{Im}\left\{\sum_{k=1}^{N} S^*_U(k) \cdot S_L(k)\right\},$$

and discard the real part of the combined signal. Similarly, the real component block 145 may be configured to obtain the real part of the combined signal, $$\text{e.g. } \text{Re}\left\{\sum_{k=1}^{N} S^*_U(k) \cdot S_L(k)\right\},$$

and discard the imaginary part of the combined signal. Additionally, the VCO block 160 may be configured to control clock timing and sampling frequency based on the imaginary part of the combined signal. The first and second weighted linear term or factor update block 150 may be configured to update the first and second weighted linear terms $h_1$ and $h_2$ based on the real part of the combined signal. Specifically, the first weighted linear term $h_1$ may be updated based on the last updated value and the real part of the combined signal, according to $$h_1(n+1) = h_1(n) + \mu \frac{\partial}{\partial h_1} \Delta \varepsilon^2 (h_1, h_2),$$

where μ is a constant that may be determined empirically and n enumerates the sequence of updated $h_1$ values. Similarly, the second weighted linear term $h_2$ may be updated according to $$h_2(n+1) = h_2(n) + \mu \frac{\partial}{\partial h_2} \Delta \varepsilon^2(h_1, h_2).$$

The value of $\Delta \epsilon^2 (h_1, h_2)$ may be equal to $$\text{Re}\left\{\sum_{k=1}^{N} S_U^*(k) \cdot S_L(k)\right\},$$

and $h_1$ and $h_2$ may satisfy the constraint $|h_1|^2 + |h_2|^2 = 1$. The value of $$\frac{\partial}{\partial h_1} \Delta \varepsilon^2 (h_1, h_2)$$

may be estimated according to:

$$\frac{\partial}{\partial h_1} \Delta \varepsilon^2(h_1, h_2) = \frac{1}{2} \cdot \text{Re} \sum_k [h_2 X_{USB}(k) \cdot Y_{LSB}^*(k) + h_2 X_{LSB}(k) \cdot Y_{USB}^*(k)],$$

and the value of $$\frac{\partial}{\partial h_2} \Delta \varepsilon^2 (h_1, h_2)$$

may be estimated according to:

$$\frac{\partial}{\partial h_2} \Delta \varepsilon^2(h_1, h_2) = 2 \cdot h_2 \cdot \text{Re} \sum_k \{[Y_{USB}(k) \cdot Y_{LSB}^*(k) - X_{USB}(k) \cdot X_{LSB}^*(k)]\} + \text{Re}\left\{\sum_k [h_1 X_{LSB}^*(k) \cdot Y_{USB}(k) + h_1 X_{USB}^*(k) \cdot Y_{LSB}(k)]\right\}.$$

Figure 2:
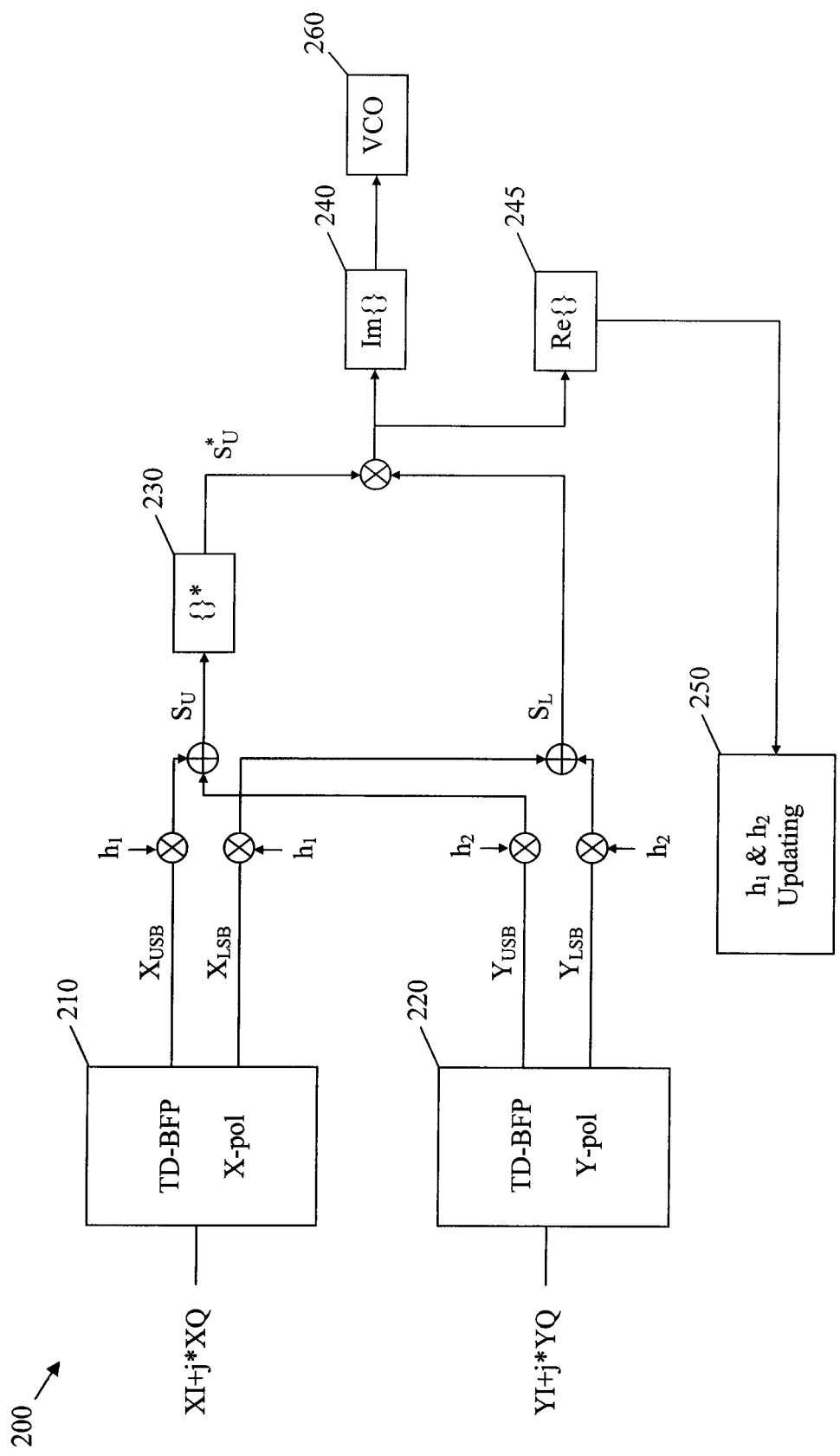
FIG. 2 is a schematic diagram of another embodiment of a clock recovery system.

FIG. 2 illustrates another embodiment of a clock recovery system 200, which may be used for polarization multiplexed optical signals in the time domain. The clock recovery system 200 may comprise a plurality of functional blocks including a first Time Domain-Bandpass Filter (TD-BPF) block 210 (e.g. for X-polarization) and a second TD-BPF block 220 (e.g. for Y-polarization). The clock recovery system 200 may also comprise a complex conjugate block 230, an imaginary component block 240, a real component block 245, a first and second weighted linear term or factor ($h_1$ & $h_2$) update block 250, and a VCO block 260, which may be configured similar to the corresponding blocks of the clock recovery system 100. Additionally, the clock recovery system 200 may comprise different mathematical operation blocks, such as addition and multiplication blocks.

The first TD-BPF block 210 may be configured to receive an X-polarization signal comprising a real part XI and an imaginary part XQ, and transform the signal into a USB signal component $X_{USB}$ and a LSB signal component $X_{LSB}$. To imaginary part XQ may be represented by the value of XQ multiplied by the imaginary number j, as shown in FIG. 2. The $X_{USB}$ and $X_{LSB}$ signals may be frequency domain signals similar to the corresponding signals provided by the first FFT block 110 and the second FFT block 120, respectively. Similarly, the second TD-BPF bock 220 may receive a Y-polarization signal comprising a real part YI and an imaginary part YQ (indicated by the preceding imaginary number j) and convert the signal into a USB signal component $Y_{USB}$ and a LSB signal component $Y_{LSB}$. Similar to the clock recovery system 100, the clock recovery system 200 may multiply the $X_{USB}$ and $X_{LSB}$ signals by a first weighted linear term $h_1$, and the $Y_{USB}$ and $Y_{LSB}$ signals by a second weighted linear term $h_2$. The resulting weighted signals may then be combined to obtain two signal components $S_U$ and $S_L$. The complex conjugate block 230 may obtain the complex conjugate of $S_U$, $S^*_U$, and multiply $S^*_U$ by $S_L$ to obtain a time domain combined signal, $$\text{e.g.} \sum_{k=1}^{N} S_U^*(k) \cdot S_L(k).$$

The real component block 245 may obtain the real part of the combined signal, which may be used to update the first and second weighted linear terms by the first and second weighted linear term or factor update block 250. The imaginary component block 240 may obtain the imaginary part of the combined signal, which may be used by the VCO 260 to control clock timing and sampling frequency.

Figure 3:
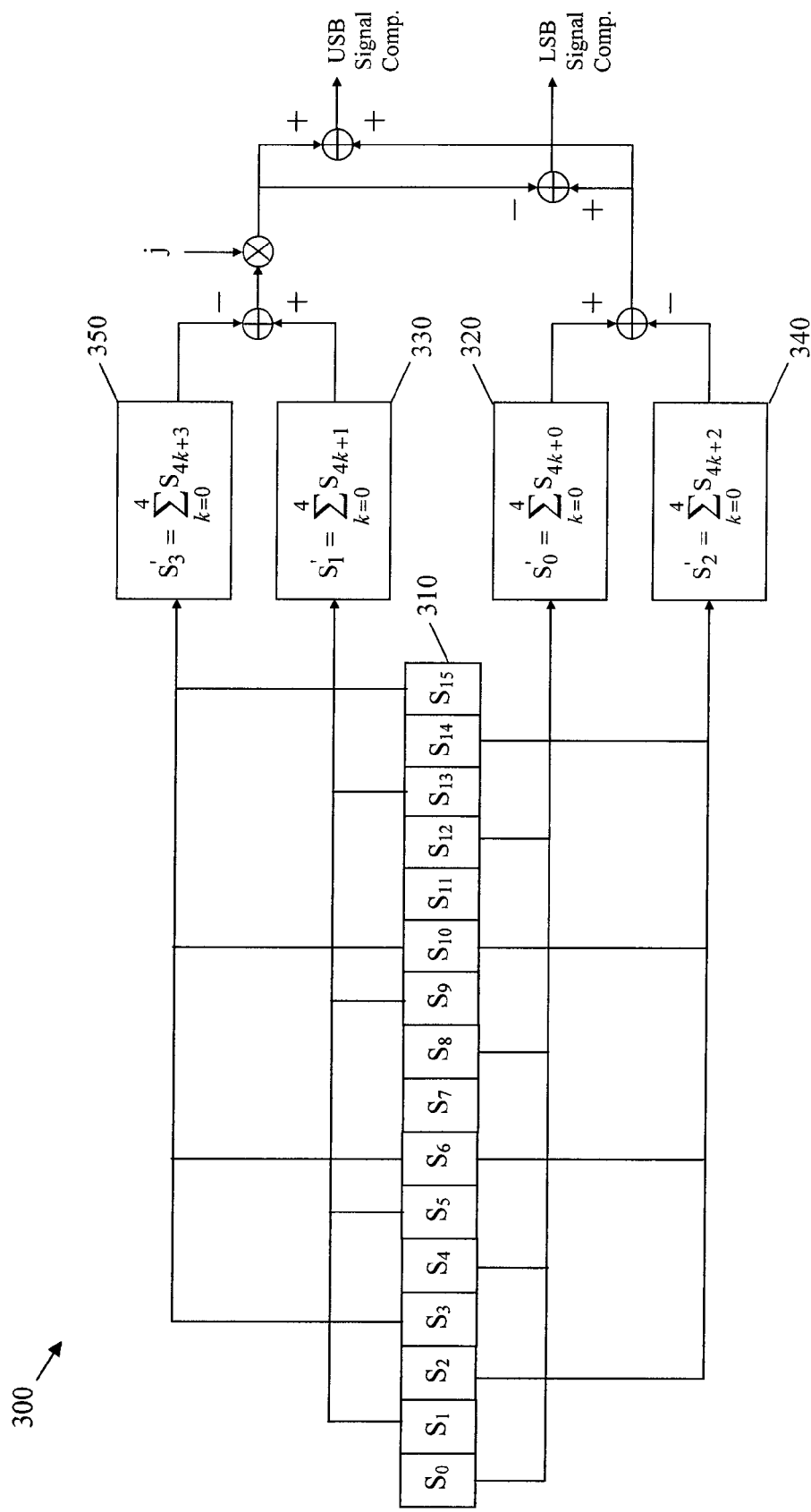
FIG. 3 is a schematic diagram of an embodiment of a time domain bandpass filter.

FIG. 3 illustrates an embodiment of a TD-BPF block 300, which may be configured similar to the first TD-BPF block 210 and the second TD-BPF block 220. The TD-BPF block 300 may be configured to transform a polarized complex signal, such as X or Y polarized signal comprising a real part and an imaginary part, into a USB signal component and a LSB signal component. The TD-BPF block 300 may comprise a plurality of functional sub-blocks including a series formulation sub-block 310, a first summation sub-block 320, a second summation sub-block 330, a third summation sub-block 340, and a fourth summation sub-block 350. Additionally, the TD-BPF block 300 may comprise different mathematical operation sub-blocks, such as addition and multiplication blocks. It will be appreciated that FIG. 3 illustrates only one example of how to calculate the USB an LSB signal, e.g. using a block of 16 consequently signals. In other embodiments, the method can be expanded for longer signal sequences or simplified for shorted signal sequences.

The series formulation sub-block 310 may be configured to express the polarized signal into a series comprising a plurality of terms, e.g. about 16 terms from $S_0$ to $S_{15}$. The first summation sub-block 320 may add together the first series term $S_0$ and every about fourth consecutive term, e.g. $S_4$, $S_8$, and $S_{12}$, to provide a first term $S_0'$, e.g. $S_0' = \Sigma_{k=0}^{4} S_{4k+0}$. The second summation sub-block 330 may add together the second series term $S_1$ and every about fourth consecutive term, e.g. $S_5$, $S_9$, and $S_{13}$, to provide a second term $S_1'$, e.g. $S_1' = \Sigma_{k=0}^{4} S_{4k+1}$. The third summation sub-block 340 may add together the third series term $S_2$ and every about fourth consecutive term, e.g. $S_6$, $S_{10}$, and $S_{14}$, to provide a third term $S_2'$, e.g. $S_2' = \Sigma_{k=0}^{4} S_{4k+2}$. The fourth summation sub-block 350 may add together the fourth series term $S_3$ and every about fourth consecutive term, e.g. $S_7$, $S_{11}$, and $S_{15}$, to provide a fourth term $S_3'$, e.g. $S_3' = \Sigma_{k=0}^{4} S_{4k+3}$. The third term may be subtracted from the first term to obtain a first combined term, e.g. $S_0' - S_2'$. The fourth term may also be subtracted from the second term and the result may be multiplied by the imaginary number j to obtain a second combined term, e.g. $j \cdot (S_0' - S_2')$. Hence, the first combined term and the second combined term may be added to provide the USB signal component (e.g. $X_{USB}$ or $Y_{USB}$), and the first combined term may be subtracted from the second combined term to provide the LSB signal component (e.g. $X_{LSB}$ or $Y_{LSB}$).

Figure 4:
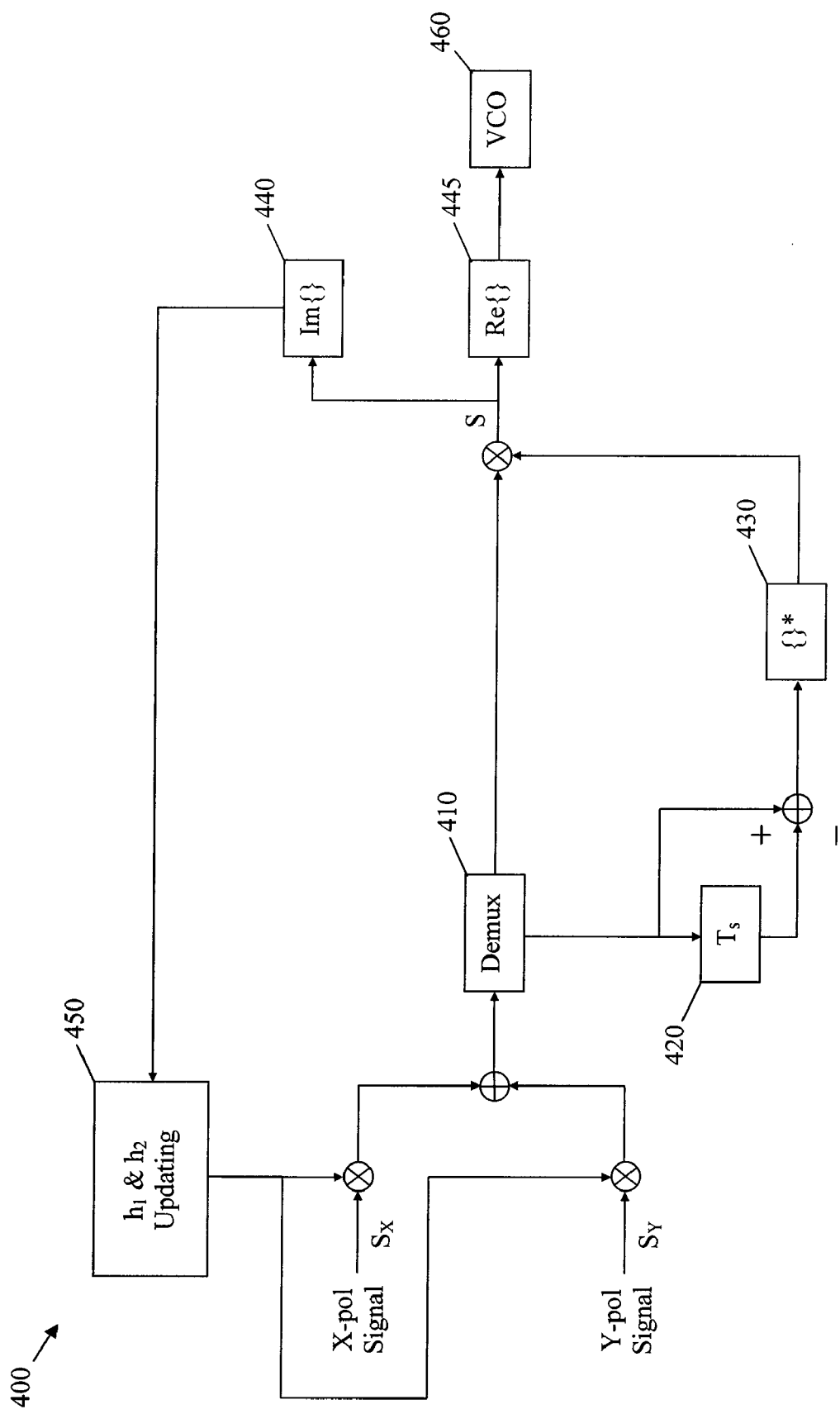
FIG. 4 is a schematic diagram of another embodiment of a clock recovery system.

FIG. 4 illustrates another embodiment of a clock recovery system 400, which may be used for clock recovery of polarization multiplexed optical signals in the time domain. As such, the clock recovery system 400 may receive an X-polarized signal component $S_X$ and a Y-polarized signal component $S_Y$, for instance at about twice the baud or modulation rate of the polarization multiplexed optical signals, and combine the two signals to obtain a time domain combined signal comprising a real part and an imaginary part. The clock recovery system 400 may comprise a plurality of functional blocks, including a demultiplexer (DEMUX) block 410, time delay block 420, a complex conjugate block 430, an imaginary component block 440, a real component block 445, a first and second weighted linear term ($h_1$ & $h_2$) update block 450, and a VCO block 460. Additionally, the clock recovery system 400 may comprise different mathematical operation blocks, such as addition and multiplication blocks.

As shown in FIG. 4, the X-polarized signal component $S_X$ and Y-polarized signal component $S_Y$ may be multiplied by a first weighted linear term $h_1$ and a second weighted linear term $h_2$, respectively, and then added together into an intermediate signal. The DEMUX block 410 may be configured to split the intermediate signal into a first copy signal and a second copy signal. The time delay block 420 may be configured to receive the second copy signal and insert a time delay T, which may be predetermined, into the second copy signal to obtain a first delay signal. The first delay signal may be subtracted from the second copy signal to obtain a second delay signal at about half the time delay T (e.g. T/2). The complex conjugate block 430 may then obtain the complex conjugate of the second delay signal, which may be multiplied by the first copy signal to provide a time domain combined signal S. The imaginary component block 440 may obtain the imaginary part of the combined signal, which may be used to update the first and second weighted linear terms by the first and second weighted linear term update block 450. Additionally, the real component block 445 may obtain the real part of the combined signal, which may be used by the VCO 460 to control clock timing and sampling frequency.

As mentioned above, the first and second weighted linear term update block 450 may be configured to update the first and second weighted linear terms $h_1$ and $h_2$ based on the imaginary part of the combined signal. Specifically, the first weighted linear term $h_1$ may be updated based on the last updated value and the imaginary part of the combined signal, according to $$h_1(n+1) = h_1(n) + \mu \frac{\partial}{\partial h_1} \Delta \varepsilon^2(h_1, h_2),$$

where $\mu$ is a constant that may be determined empirically and n enumerates the sequence of updated $h_1$ values. Similarly, the second weighted linear term $h_2$ may be updated according to $$h_2(n+1) = h_2(n) + \mu \frac{\partial}{\partial h_2} \Delta \varepsilon^2(h_1, h_2).$$

The value of $\Delta \varepsilon^2(h_1, h_2)$ may be equal to $\text{Im}\{S(n+T/2) \cdot [S^*(n) - S^*(n+1)]\}$.

In alternative embodiments, a clock recovery system based on other architectures may be used to retrieve timing information in the frequency domain or the time domain from a first polarized signal component and a second polarized signal component. Accordingly, each of the first polarized signal component and second polarized signal component may be multiplied by a first weighted linear term, a second weighted linear term, or both. The resulting weighted signal components may then be used to obtain a combined signal, which may be partitioned into a real part and an imaginary part. The first and second weighted linear terms may then be updated using one of the real part and imaginary part of the combined signal, and the timing information may be obtained from the other one of the real part and imaginary part. In some embodiments, any quantity of weighted linear terms, which may be greater than about two, may be multiplied with any quantity of polarized signal components to obtain the combined signal and hence may be updated based on the combined signal.

Figure 5:
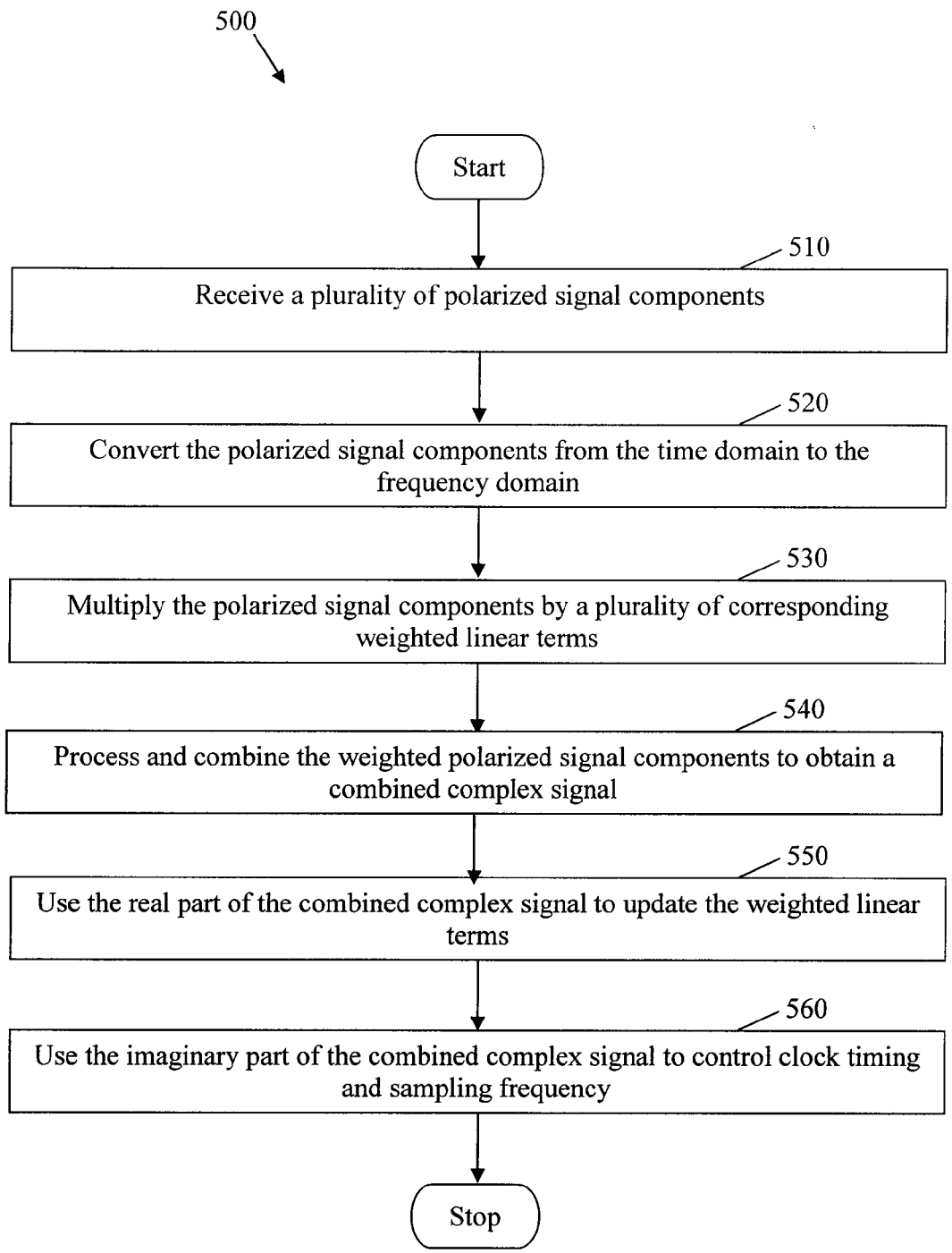
FIG. 5 is a flowchart of an embodiment of a clock recovery method.

FIG. 5 is a flowchart of one embodiment of a clock recovery method 500, which may be used to retrieve time and/or frequency information for a polarization multiplexed optical signal in the frequency domain. The method may begin at block 510, where a plurality of polarized signal components may be received. The polarized signal components may comprise fiber dispersion and/or PMD due to the signal traveling through the transmission link, e.g. the optical fiber. As such, the dispersion may need to be compensated for and the signal may need clock recovery. For example, a clock recovery system, such as the clock recovery system 100, may receive an X-polarized signal and/or Y-polarized signal in the time domain, which may comprise a real part component and an imaginary part component. At block 520, the polarized signal components may be converted from the time domain to the frequency domain, for example using FFT or TD-BPF. Next at block 530, the polarized signal components may be multiplied by a plurality of corresponding weighted linear terms or factors. At block 540, the weighted polarized signal components may be processed and combined, for example by a plurality of functional blocks as shown in the clock recovery system 100, to obtain a combined complex signal. The combined complex signal may comprise a real part and an imaginary part. At block 550, the real part of the combined complex signal may be used to update the weighted linear terms, which may then be multiplied by the next received polarized signal components at the next time block. At block 560, the imaginary part of the combined complex signal may be used to control clock timing and sampling frequency. The clock recovery method 500 may then end.

Figure 6:
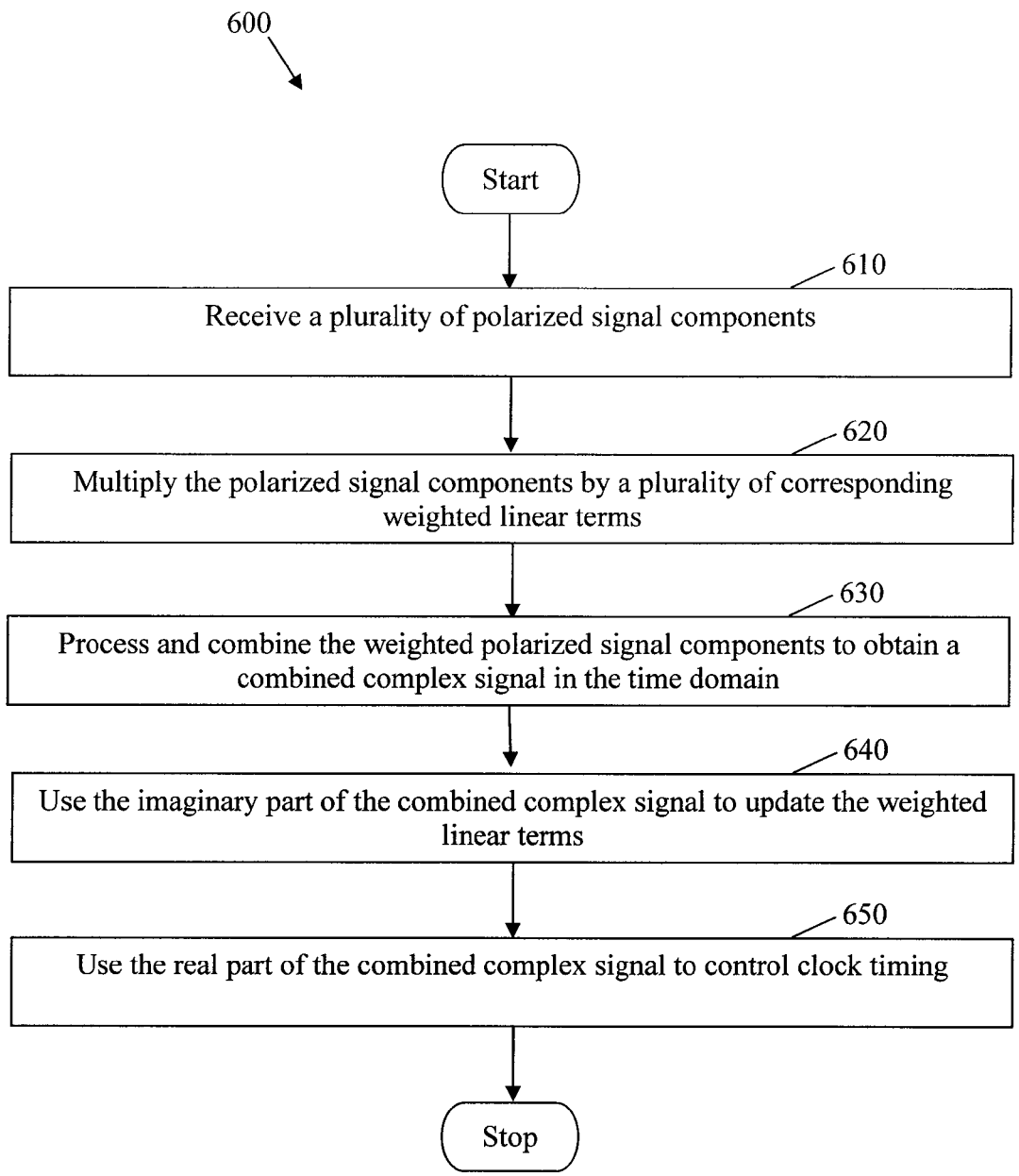
FIG. 6 is a flowchart of another embodiment of a clock recovery method.

FIG. 6 is a flowchart of one embodiment of a clock recovery method 600, which may be used to retrieve time information for a polarization multiplexed optical signal in the time domain. The method may begin at block 610, where a plurality of polarized signal components may be received. For example, a clock recovery system, such as the clock recovery system 200, may receive an X-polarized signal and/or Y-polarized signal in the time domain. Next at block 620, the polarized signal components may be multiplied by a plurality of corresponding weighted linear terms or factors. At block 630, the weighted polarized signal components may be processed and combined, for example by a plurality of functional blocks as shown in the clock recovery system 200, to obtain a combined complex signal in the time domain. At block 640, the imaginary part of the combined complex signal may be used to update the weighted linear terms, which may then be multiplied by the next received polarized signal components at the next time block. At block 650, the real part of the combined complex signal may be used to control clock timing. The clock recovery method 600 may then end.

Figure 7:
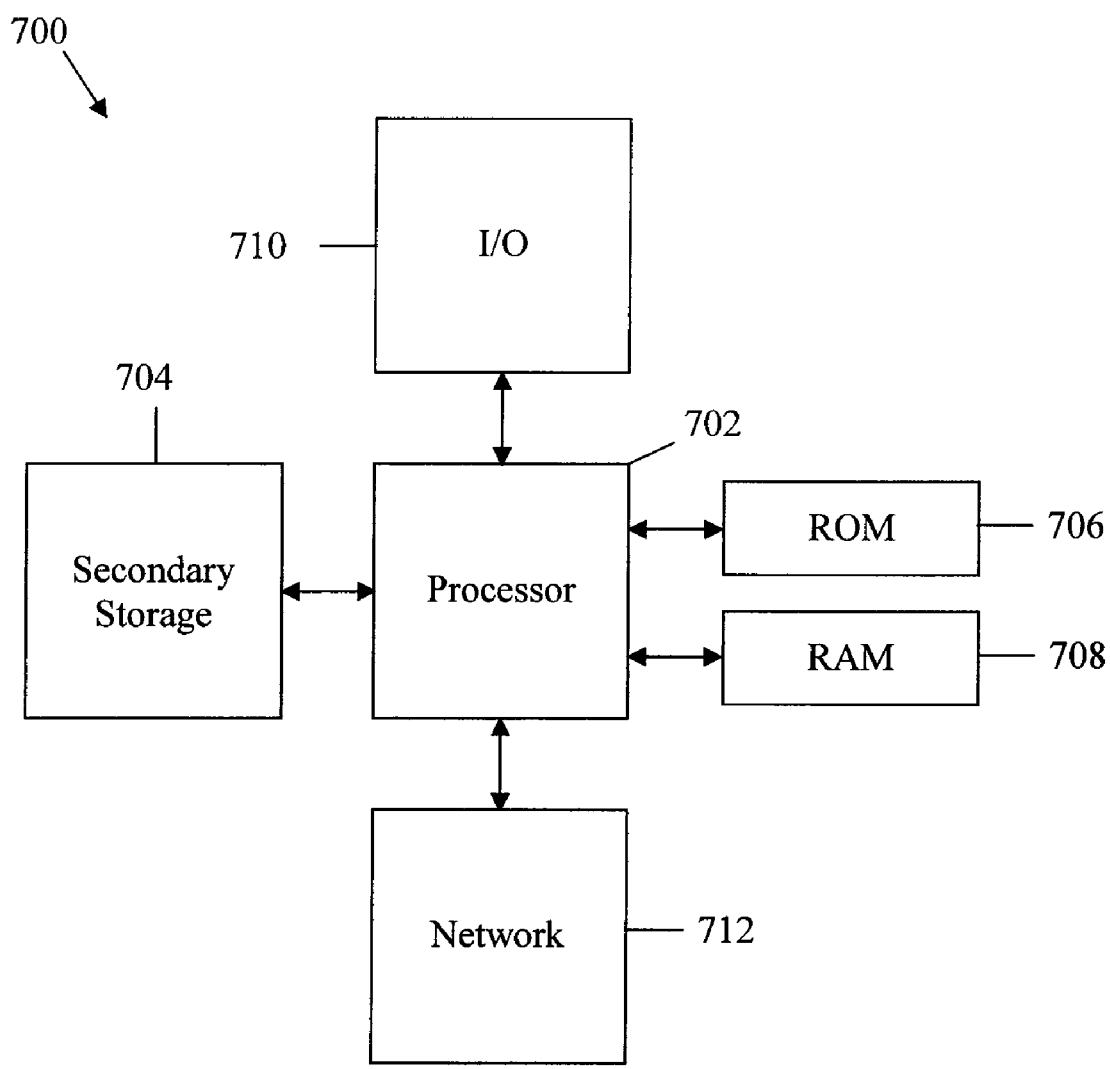
FIG. 7 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 7 illustrates a typical, general-purpose network component 700 suitable for implementing one or more embodiments of the components disclosed herein. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips, or may be part of one or more application specific integrated circuits (ASICs).

The secondary storage 704 is typically comprised of one or more disk drives or tape drives and is used for non-volatile storage of data and as an overflow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 5, 4, etc.; greater than 0.10 includes 0.11, 0.12, 0.15, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 5 percent, 4 percent, 5 percent, . . . , 50 percent, 51 percent, 52 percent, . . . , 75 percent, 76 percent, 77 percent, 78 percent, 77 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
    a plurality of receivers each configured to receive a plurality of polarized signals;
    a voltage control oscillator (VCO) coupled to the receivers and configured to control timing and sampling frequency of the polarized signals; and
    a signal processing component coupled to the receivers and configured to update a plurality of weighted linear factors,
    wherein the weighted linear factors are updated using only linear operations,
    wherein the polarized signals and the weighted linear factors are used to obtain a combined signal, and
    wherein the weighted linear factors are updated using a real part or an imaginary part of the combined signal.

2. The apparatus of claim 1, wherein each polarized signal comprises a first polarized signal component and a second polarized signal component that correspond to a polarization multiplexed optical signal, and wherein the polarized signals are polarized optical signals.

3. The apparatus of claim 2, wherein the receivers comprise a first Time Domain-Bandpass Filter (ID-BPF) and a second TD-BPF, wherein the first TD-BPF transforms the first polarized signal component into a first Up-Side-Band (USB) signal and a first Low-Side-Band (LSB) signal in a time domain, and wherein the second TD-BPF transforms the second polarized signal component into a second Up-Side-Band (USB) signal and a second Low-Side-Band (LSB) signal.

4. The apparatus of claim 2, wherein the receivers comprise a first Fast Fourier Transform (FFT) signal processor and a second FFT signal processor, wherein the first FFT signal processor converts the first polarized signal component from a time domain to a frequency domain, and wherein the second FFT signal processor converts the second polarized signal component from the time domain to the frequency domain.

5. The apparatus of claim 4, wherein the first FFT signal processor selects a part of first polarized FFT signal component to form a first Up-Side-Band (USB) signal and selects another part of the first polarized signal to form the first Low-Side-Band (LSB) signal, and wherein the second FFT signal processor selects a part of second polarized FFT signal component to form the second USB signal and selects another part of the second polarized signal to form the second LSB signal.

6. The apparatus of claim 5, wherein the weighted signal factors comprise a first weighted linear factor and a second weighted linear factor, wherein each of the first USB signal and first LSB signal is multiplied by the first weighted linear factor, and wherein each of the second USB signal and second LSB signal is multiplied by the second weighted linear factor.

7. The apparatus of claim 6, wherein the signal processing component adds the first USB signal multiplied by the first weighted linear factor to the second USB signal multiplied by the second weighted linear factor to obtain a first signal component, and adds the first LSB signal multiplied by the first weighted linear factor to the second LSB signal multiplied by the second weighted linear factor to obtain a second signal component.

8. The apparatus of claim 7, wherein a complex conjugate of the first signal component is multiplied by the second signal component to obtain the combined signal.

9. An apparatus comprising:
at least one processor configured to;
receive a plurality of polarized multiplexed optical signals;
multiply the polarized multiplexed optical signals by a plurality of weighted linear terms;
combine the polarized multiplexed optical signals multiplied by the weighted linear terms to obtain a combined complex signal;
use one of the real part or imaginary part of the combined complex signal to update the weighted linear terms, wherein the weighted linear terms are updated using only linear operations; and
use the other one of the real part or imaginary part of the combined complex signal to control clock timing.

10. The apparatus of claim 9, wherein the at least one processor is further configured to convert the polarized multiplexed optical signals from a time domain to a frequency domain.

11. The apparatus of claim 10, wherein the real part of the combined complex signal is used to update the weighted linear terms, and wherein the imaginary part of the combined complex signal is used to control clock timing.

12. The apparatus of claim 9, wherein the polarized multiplexed optical signals multiplied by the weighted linear terms are combined in a time domain, wherein the imaginary part of the combined complex signal is used to update the weighted linear terms, and wherein the real part of the combined complex signal is used to control clock timing.

13. The apparatus of claim 9, wherein combining the polarized multiplexed optical signals comprises:
obtaining a first signal component and a second signal component;
obtaining a complex conjugate of the first signal component; and
computing the product of the complex conjugate and the second signal component to obtain the combined complex signal.

14. The apparatus of claim 13, wherein a step size is chosen to track a State of Optical Polarization (SOP) of the polarized multiplexed optical signals without interrupting clock recovery.

15. The apparatus of claim 9, wherein the weighted linear terms comprise a first weighted linear term ($h_1$) and a second weighted linear term ($h_2$), wherein $h_1$ is updated based on a previously updated value of $h_1$ according to $$h_1(n+1) = h_1(n) + \mu \frac{\partial}{\partial h_1} \Delta \varepsilon^2(h_1, h_2),$$

and wherein $h_2$ is updated based on a previously updated value of $h_2$ according to $$h_2(n+1) = h_2(n) + \mu \frac{\partial}{\partial h_2} \Delta \varepsilon^2(h_1, h_2),$$

where $\mu$ is a constant determined empirically and n enumerates the sequence of updated $h_1$ and $h_2$ values.

16. The apparatus of claim 15, wherein $\Delta \epsilon^2(h_1, h_2)$ is equal to the real part of the combined complex signal $$\text{Re}\left\{\sum_{k=1}^{N} S_U^*(k) \cdot S_L(k)\right\},$$

and $h_1$ and $h_2$ satisfy the constraint
$$|h_1|^2 + |h_2|^2 = 1.$$

17. The apparatus of claim 15, wherein $$\frac{\partial}{\partial h_1} \Delta \varepsilon^2(h_1, h_2)$$

is estimated according to $$\frac{\partial}{\partial h_1} \Delta \varepsilon^2(h_1, h_2) = \frac{1}{2} \cdot \text{Re} \sum_k [h_2 X_{USB}(k) \cdot Y_{LSB}^*(k) + h_2 X_{LSB}(k) \cdot Y_{USB}^*(k)],$$

wherein $\frac{\partial}{\partial h_2} \Delta \varepsilon^2(h_1, h_2)$ wherein $$\frac{\partial}{\partial h_2} \Delta \varepsilon^2(h_1, h_2)$$

is estimated according to $$\frac{\partial}{\partial h_2} \Delta \varepsilon^2(h_1, h_2) = 2 \cdot h_2 \cdot \text{Re} \sum_k \{[Y_{USB}(k) \cdot Y_{LSB}^*(k) - X_{USB}(k) \cdot X_{LSB}^*(k)]\} +$$
$$\text{Re}\left\{\sum_k [h_1 X_{LSB}^*(k) \cdot Y_{USB}(k) + h_1 X_{USB}^*(k) \cdot Y_{LSB}(k)]\right\},$$

where $X_{USB}$ is a first Up-Side-Band (USB) signal component of the polarized multiplexed optical signals, $X_{LSB}$ is a first Low-Side-Band (LSB) signal component, $Y_{USB}$ is a second USB signal component, and $Y_{LSB}$ is a second LSB signal component.

18. A method comprising:
using a plurality of linear factors to linearly combine a plurality of polarized optical signals to yield a combined signal;
using, by: a voltage controlled oscillator, the combined signal to provide time recovery information; and updating the linear factors using a combination of the polarized optical signals, wherein the linear factors are updated sing only linear operations.

19. The method of claim 18, wherein time recovery information is obtained using the linear factors and based on a Godard clock recovery algorithm, wherein the combination of the polarized optical signals is obtained in the frequency domain according to $$\sum_{k=1}^{N} S_U^*(k) \cdot S_L(k),$$

where $S^*_U$ is a complex conjugate of a first combination of the polarized optical signals, $S_L$ is a second combination of the polarized optical signals, N is the number of considered frequencies in the signals, and k is an integer that enumerates the frequencies.

20. The method of claim 18, wherein time recovery information is obtained using the linear factors and based on a time domain clock recovery algorithm, wherein the combination of the polarized optical signals is obtained in the time domain according to $\text{Im}\{S(n+T/2) \cdot [S^*(n) - S^*(n+1)]\}$, where S is the combination of the polarized optical signals, and n enumerates the time sequence of the polarized optical signals.

* * * * *

UNITED STATES PATENT AND TRADEMARK OFFICE
CERTIFICATE OF CORRECTION

PATENT NO. : 8,331,803 B2
APPLICATION NO. : 12/574852
DATED : December 11, 2012
INVENTOR(S) : Chuandong Li et al.

It is certified that error appears in the above-identified patent and that said Letters Patent is hereby corrected as shown below:

Column 12:
Lines 37-39, printed claim 17, delete the first "wherein plus the formula" because it was printed twice.

Column 13:
Line 3, printed claim 18, delete "sing" and insert --using--.

Signed and Sealed this
Nineteenth Day of February, 2013

Teresa Stanek Rea
*Acting Director of the United States Patent and Trademark Office*